Jan. 19, 1932.  E. GEIGER  1,841,529
STORAGE BUILDING
Filed May 3, 1928   4 Sheets-Sheet 1
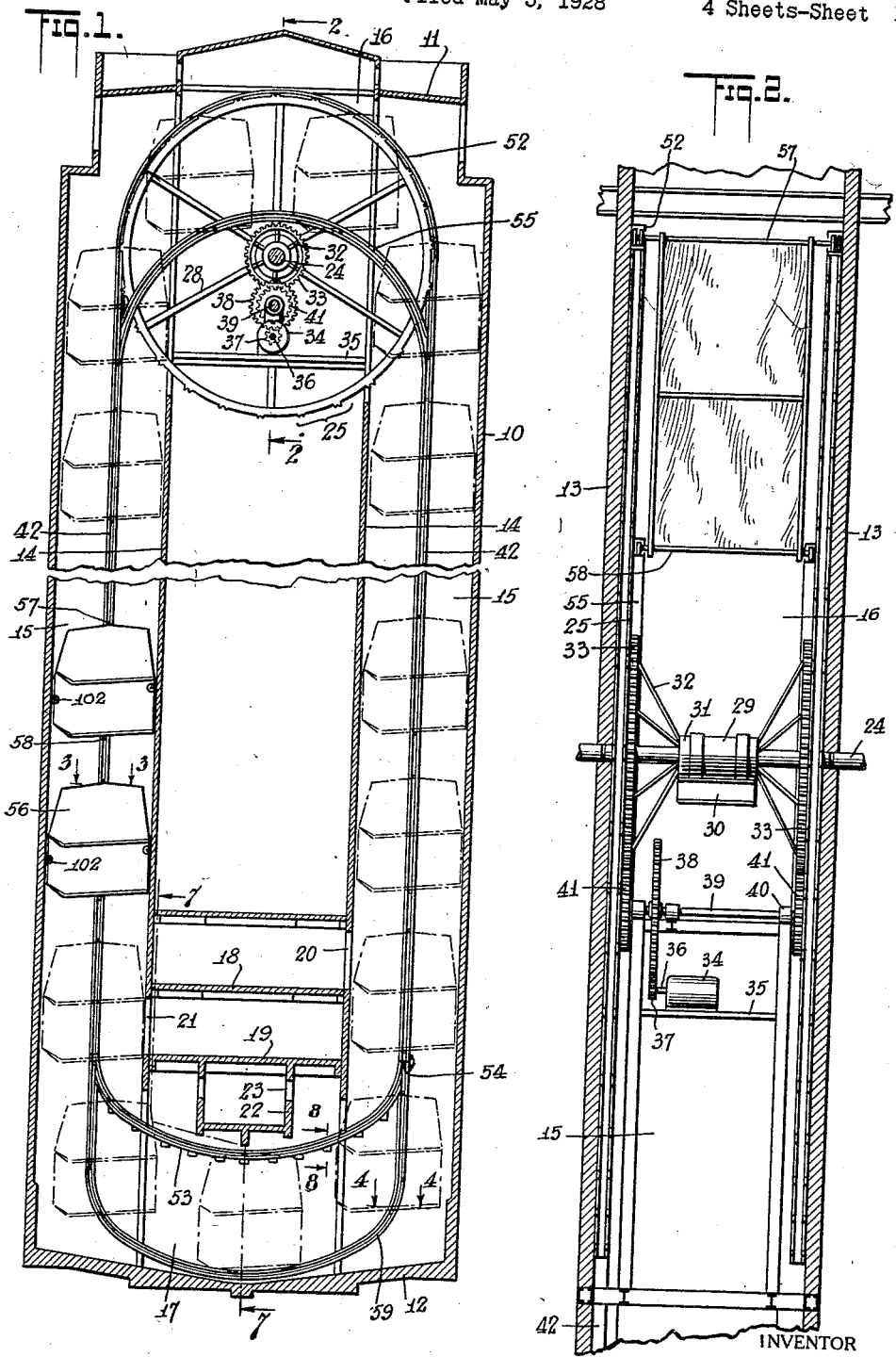
INVENTOR
Ernst Geiger
BY
Franklin J. Foster
ATTORNEY Jan. 19, 1932.  E. GEIGER  1,841,529
STORAGE BUILDING
Filed May 3, 1928     4 Sheets-Sheet 2
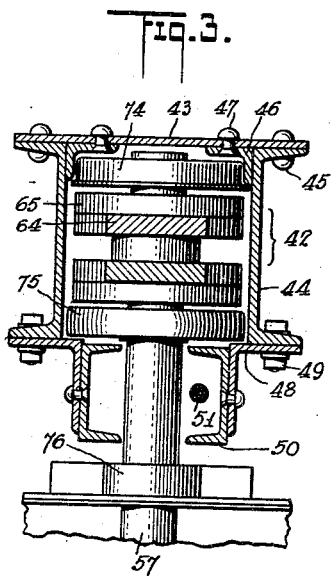
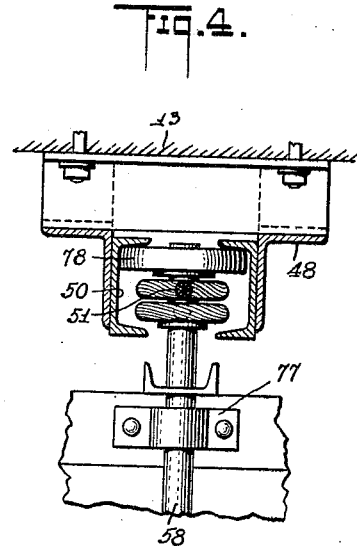
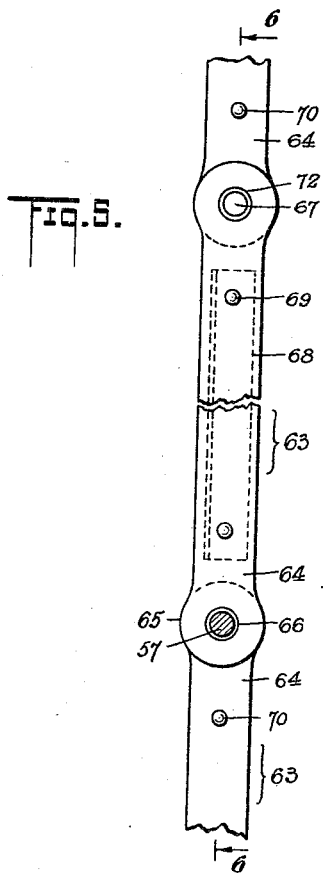
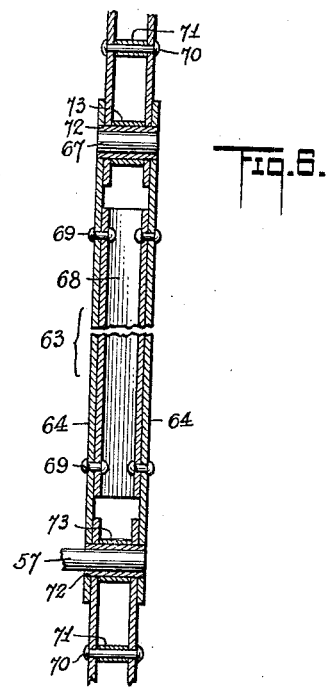
INVENTOR
*Ernst Geiger.*
BY
*Franklin J. Foster*
ATTORNEY Jan. 19, 1932.                    E. GEIGER                  1,841,529
                               STORAGE BUILDING
                              Filed May 3, 1928            4 Sheets-Sheet 3
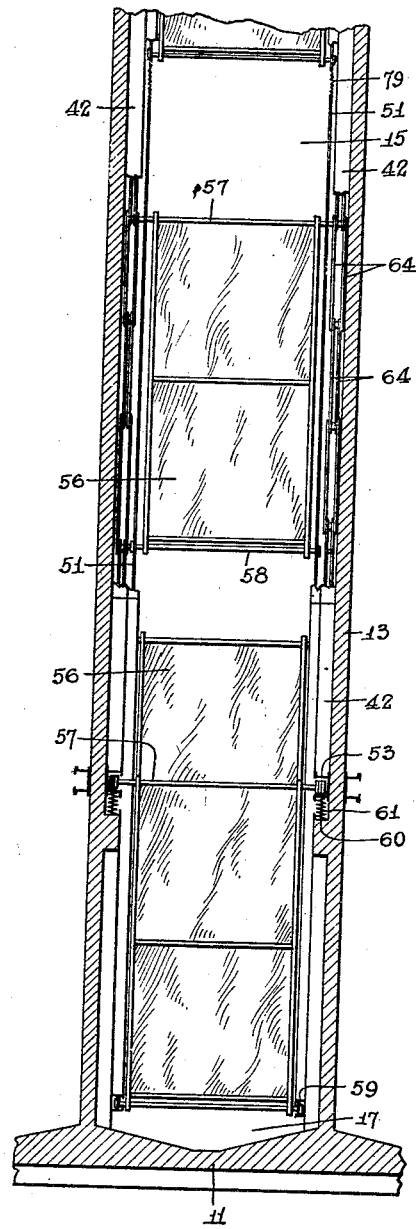
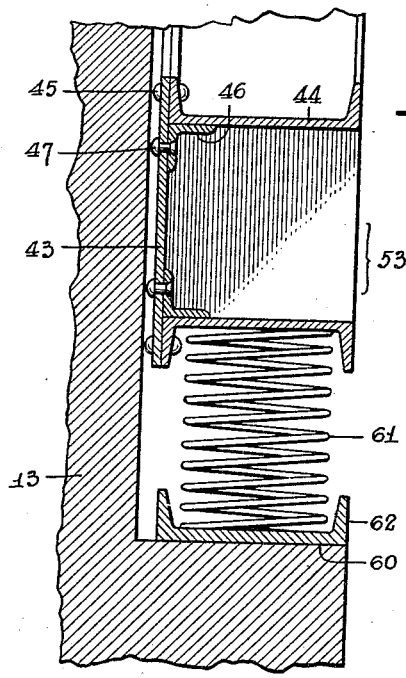
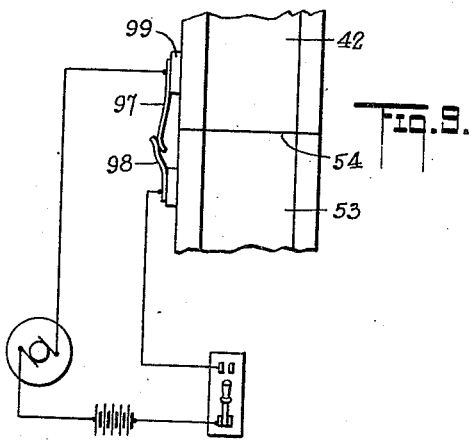
INVENTOR
*Ernst Geiger.*
BY
*Franklin J. Foster*
ATTORNEY Jan. 19, 1932.　　　　　　E. GEIGER　　　　　　1,841,529
STORAGE BUILDING
Filed May 3, 1928　　　　4 Sheets-Sheet 4
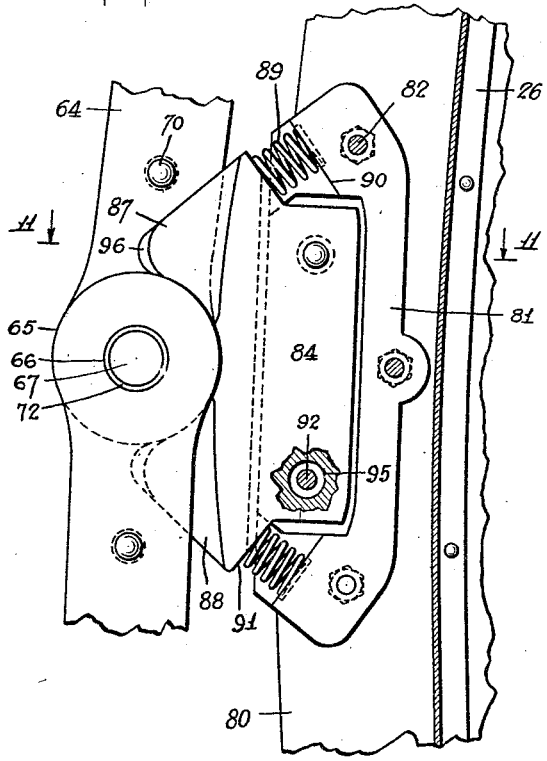
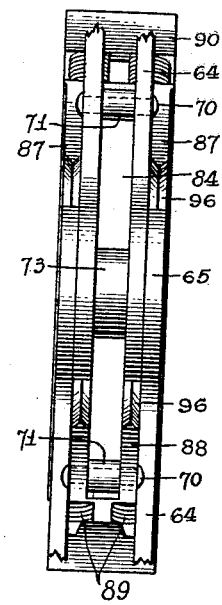
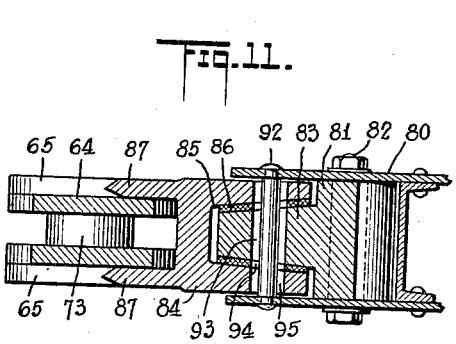
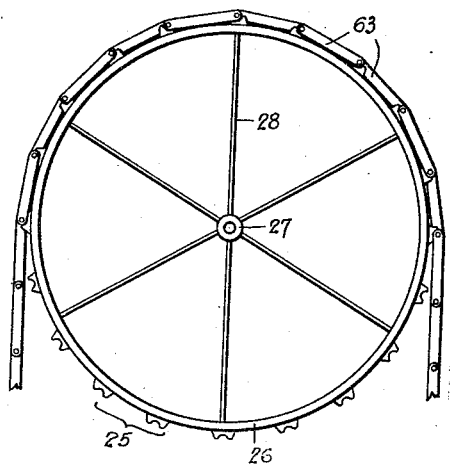
INVENTOR
*Ernst Geiger*
BY
*Franklin J. Foster*
ATTORNEY Patented Jan. 19, 1932

1,841,529

UNITED STATES PATENT OFFICE

ERNST GEIGER, OF IRVINGTON, NEW JERSEY

STORAGE BUILDING

Application filed May 3, 1928. Serial No. 274,714.

The present invention is concerned with improvements in storage buildings or storage units of the general character in which a plurality of storage cabins are mounted on endless flexible conveyor means and caused to travel in an orbital path.

This general type of structure while capable of use in storage warehouses, hotels, department stores and other locations where furniture, automobiles or other classes of goods are to be temporarily stored in readily accessible compartments, is particularly adapted and primarily intended for embodiment in an elevator garage of the general character disclosed in my prior Patent No. 1,636,600 issued July 19th, 1927.

It will be recalled that in my prior patent I showed a garage structure in which an endless series of elevator cabins mounted on endless chains moved in an orbital path through parallel vertical shaftways and through shaft-connecting crossways at the top and bottom of the building. The space enclosed between the shaftways and crossways was subdivided to provide car delivery and receiving floors with which any cabin of the endless chain might be alined.

The present invention represents an improvement over the structure disclosed in said patent in many respects.

A primary object of the invention is to provide a construction in which the cabins cannot fall and pile up in the bottoms of the shaftways in case one or both of their supporting chains break.

More specifically an object of the invention is to provide a construction in which a break in the chains cannot materially affect the positions of the cabins nor cause even a slight precipitate drop of any chain in its shaftway or crossway. In this respect the safety means which I employ represents an improvement over all present types of elevator safety mechanism which is in operative to check the descent of a car until after the car has gained momentum.

To accomplish this result I preferably suspend all of the cabins on endless chains of a unique type, these chains being so constructed and so mounted in suitable guideways that they are capable of withstanding compression strains as well as tension strains and will when a break occurs serve as a rigid prop or strut to sustain the weight of all of the elevator cars. Thus a break in the chain serves only to transfer the weight of the cabins from the chain driving sprocket wheels at the top of the structure to the chain guides at the bottom of the structure.

Another object of the invention is to provide safety means for preventing one cabin from dropping on to a subjacent one even if the cabin breaks away from its carrying chains.

The means for accomplishing this object preferably comprises secondary flexible devices which connect all of the cabins and which ordinarily have merely a guiding function. In the event that a cabin breaks away from its chain, however, the secondary flexible devices are sufficiently strong to support the weight of the single cabin which is thereby transferred to them.

Another object of the invention is to provide a novel means for so guiding the cabins of the endless chain that the cabins are held against swaying or swinging on their supporting chains as they are moved through the crossways. This means as suggested above, includes the secondary endless, flexible devices connected to all of the cabins. By connecting the tops of all of the cabins to the chains and the bottoms of all of the cabins to the secondary flexible devices and leading the chain and secondary flexible devices through separate guideways as the cabins traverse the crossways, swaying of the cabins is effectively prevented.

Another object of the invention is to provide a chain and guide structure of general utility so designed that the chain may withstand compression strains and chain runs serve in an emergency as supporting struts or props as well as suspension means for the load which they carry.

Still another object of the invention is to provide novel and efficient means for connecting the cabins to their supporting and guiding mechanism; for preventing contact of the chains with their guideways and for insuring only rolling contact of all the movable parts with their stationary guiding parts.

Still other objects are to provide means for insuring the substantially equal distribution of the weight of the loaded chains to all of the teeth of their driving and carrying sprockets; to prevent the occurrence of slack in the secondary flexible devices, and to prevent the normal wear in the moving parts from seriously interfering with the efficient operation of the mechanism.

With the above noted and other objects in view, the invention consists in certain novel features of construction and combinations and arrangements of parts which will be more fully hereinafter described and pointed out in the claims.

The invention may be more fully understood from the following description in connection with the accompanying drawings wherein:

Fig. 1 is a vertical sectional view through a garage embodying the invention.

Fig. 2 is an enlarged vertical sectional view on the line 2—2 of Fig. 1.

Fig. 3 is a transverse sectional detail on the line 3—3 of Fig. 1.

Fig. 4 is a similar view on the line 4—4 of Fig. 1.

Fig. 5 is an enlarged fragmentary side elevational view of the novel sprocket chain.

Fig. 6 is a longitudinal sectional view on the line 6—6 of Fig. 5.

Fig. 7 is an enlarged view for the most part in vertical section taken approximately on the staggered line 7—7 of Fig. 1.

Fig. 8 is an enlarged transverse sectional view through the chain guide taken approximately on the line 8—8 of Fig. 1.

Fig. 9 is a wiring diagram.

Fig. 10 is an enlarged side elevation detail showing one of the sprocket teeth engaging the chain.

Fig. 11 is a transverse sectional view on the line 11—11 of Fig. 10.

Fig. 12 is an edge view of Fig. 10 and

Fig. 13 is a somewhat diagrammatic side elevational view of the sprocket wheel and chain.

I have shown the invention embodied in a garage structure and shall describe the invention particularly in this connection. It should be borne in mind, however, that the invention is adapted for use in various analogous structures and the use of the word garage in the specifications and claims is intended to cover all analogous building units.

It may also be noted that Figs. 1, 2, and 7 of the drawings are highly diagrammatic, the other detail views being relied upon for disclosures of such structural details as form part of the invention.

In the drawings I have shown a building including side walls 10 and a roof 11 and a basement floor 12. This building may be of any desired depth and contain any suitable number of endless cabin train units. The front and rear walls of the buildings are not illustrated but only two spaced vertical transverse partition walls 13, between which one of the cabin trains may be confined.

Near the side walls of the building, partition walls 13 are connected by vertical walls 14 disposed at right angles to the walls 13 and cooperating with the walls 12 and 13 to define a vertical shaftway 15 at each side of the building. These shaftways preferably extend the full height of the building and are connected at their tops and bottoms by crossways 16, 17 respectively.

The central space of the building between the shaftways 15 may be subdivided into any suitable number of floors. A lower pair of such floors 18 and 19 constitute delivery and receiving floors respectively. For an explanation of one manner in which said floors may communicate with an outside street or the like, reference may be had to my prior patent, above referred to.

One wall 13 is formed with a doorway 20 providing communication between one shaftway 15 and the delivery floor 18 while the other wall 13 is provided with a similar doorway 21 affording communication between the other shaftway 15 and the receiving floor 19.

Below the receiving floor 19, a fire inspection tunnel 22 is provided, this tunnel extending through the series of lower crossways 17 and having windows 23 therein to permit inspection of the movable cabins as they pass through the lower crossways.

Adjacent to the top of the building and centrally disposed between shaftways 15, a shaft 24 is journalled in suitable bearings in the walls 13. Loosely mounted on each end of this shaft closely adjacent the two walls 13 are large sprocket wheels 25. These wheels which will be more fully described hereinafter include toothed rims 26, and radial spokes 28 connected to hubs 27. A relatively massive bearing 29 supports the center of shaft 24, this bearing being mounted on a platform 30. Collars 31 are keyed to the shaft 24 adjacent each end of the bearings 29 and connected by inclined bracing arms 32 to gear wheels 33 fixed in any suitable manner to the inner faces of the large sprocket wheels 25.

Any suitable means may be employed for driving the gears 33 to thereby turn the sprocket wheels. I have shown a driving motor 34 mounted on a floor 35 near the top of the building. The driving shaft 36 of this motor carries a gear 37 which meshes with a gear 38 on a countershaft 39 journalled in bearings 40 and provided at its ends with pinions 41 meshing with the gear wheels 33.

The sprocket wheels 25 are of a diameter equal to the distance between the centers of the opposite shaftways 15. Thus a chain running over the sprocket wheels will extend centrally down into each shaftway. The sprocket wheels are mainly accommodated in the upper crossway 16 although their edges extend into the tops of the shaftways 15 and the walls 14 and floor 35 must be cut away to accommodate them.

Secured to the face of each shaftway wall 13 and disposed centrally of the shaftway are vertical chain guides 42 the axes of which are tangential to the sprocket wheels. One of these guides is illustrated in cross section in Fig. 3 and includes a plate 43 secured against the shaftway wall and a pair of spaced channel bars 44, the channels of which face outwardly. One flange of each bar is riveted, bolted or otherwise secured as at 45 to the edges of the plate 43. Angle bars 46 are arranged within the corners defined by the channel bars 44 and plate 43 such angles including flanges lying against the backs of the channel bars and flanges riveted at 47 to the plate.

Fairly large angle bars 48 include flanges bolted at 49 to the outer flanges of the channel bars 44. The corners of the angle bars 48 extend inwardly beyond the backs of the channels 44 and the projecting flanges of the bars 48 carry spaced channel bars 50 the channels of which face each other and define a guideway for a secondary flexible device such as a cable 51. Thus the cable guide defined by the bars 50 is open at the side while the chain in the chain guideway 42 cannot be removed due to the fact that the chain is of a cross sectional area to substantially completely fill the guideway and is retained against movement out of the guideway 42 by the inwardly projecting parts of the cable guide structure.

The chain guides 42 of one shaftway 15 are connected to the chain guides 42 of the opposite shaftway 15 by similarly constructed semicircular guide sections 52 passing through the upper crossways 16 and closely following the sprocket wheel 25. The lower channel bars of these guide sections are slotted or cut away to permit the teeth of the sprocket wheels to enter the guideways and engage the chain.

At their lower ends the chain guides 42 of the opposite shaftways are connected by arcuate guide sections 53 arranged in the lower crossway 17. Preferably these lower curved sections 53 are separate from the vertical sections 42 for a purpose to be later described, the dividing line where the sections 42 and 53 abut being shown at 54.

The cable guides are connected at the top by semicircular sections 55 the distance between such section and the chain guide section 52 in any vertical plane intersecting the guides 52, 55 being substantially equal to the height of one of the cabins 56 or more specifically equal to the distance between the supporting rods 57, 58 mounted on the tops and bottoms of such cabins.

These cabins are preferably of duplex type, providing storage space for two cars. The upper rods 57 which they carry are connected to the chains and the lower rods 58 are connected to the cables 51. Thus as the cabins are carried by the chains through the upper crossway 16 they are retained in vertical position at all times by the double guide arrangement and cannot sway on their upper hanger rods 57.

A similar double guide construction is employed at the lower crossway the curved cable guide 59 being dropped below the chain guide a distance equal to the total height of a cabin as explained above.

Preferably the sprocket wheels 25 are no thicker than the chain guides 42, 52, 53 so that the upper runs 55 of the cable guide will be disposed substantially against the inner faces of the sprocket wheels as seen in Fig. 2.

Preferably also the walls 13 are formed with arcuate ledges 60 as Figs. 7, 8 show. Coiled expansion springs 61 backed against plates 62 on the ledges, sustain the weight of the chain guide section 53 and its associated connected guide section 59 and hold such sections in abutting relationship at 54 with the lower ends of the vertical sections 42 of these guideways.

As suggested above the chains of the present invention are in themselves novel and the sprocket wheels are also of a unique type. Reference may be had to Figs. 3, 5 to 7 and 10 to 13 for the above details.

The chain consists of a plurality of long rigid links 63. Each link consists of a pair of long, flat, rigid plates 64 rigidly connected together in spaced parallel relationship. Each end of each plate is rounded and enlarged at 65 and apertured at 66 for the reception of a pivot pin 67.

Any suitable means may be used for rigidly connecting the plates 64 of each link 63 together. I have shown two such means. One of them consists of a channeled or U-shaped connecting piece 68 spacing the plates of the link apart and having its flanges riveted, bolted or otherwise secured at 69 to the respective plates. The other spacing and connecting means illustrated comprises rivets 70 the intermediate portions of which carry spacer sleeves 71 the ends of which abut the inner faces of the plates 64. In assembling the chain, the enlarged apertured ends 65 of the plates of one link are received between the similarly shaped ends of the plates of an adjacent link and pivotally connected thereto. The pivotal connection illustrated in Figs. 5, 6 includes a bearing sleeve 72 having its ends received in the alined apertures 66 of the link ends and carrying a spacer sleeve 73. The pivot pins 67 are disposed within this bearing sleeve to provide between links the necessary pivotal connection.

In Fig. 3 I have shown the manner in which one of the upper cross rods 57 is attached to one of the chains. This cross rod is supported in bearings 76 mounted on the roof of its cabin. Its ends project through the open cable guideway and through the alined apertured ends 65 of two chain links 63. At points where the rods 57 are attached to the chain the ends of these rods replace the pivot pins 67. The end of rod 57 projects through the chain and at each side of the chain carries antifriction rollers 74, 75 which roll on the walls of the chain guideways as the chain and the cabins travel. These rollers are of slightly greater diameter than the enlarged ends 65 of the links and serve to prevent contact of the link ends with the walls of the chain guide.

The lower cross rods 58 are mounted in bearings 77 beneath the floors of the cabins and their projecting ends carry rollers 78 which travel in the cable guides. The cable 51 within the guideways is secured in any desired manner to the cross rods 57 as for instance by wrapping the cable around the cross rods as illustrated in Fig. 4. It may be noted that the endless cable is slightly diverted from its straight path through the cable guides by the presence of the upper hanger rods 57 which extend through the cable guideways. The cable therefore must be passed laterally around these guide rods as shown in Fig. 3 instead of running straight from one lower guide rod 58 to its adjacent guide rod 58. Due to this condition it is difficult to maintain the cable absolutely straight at all times and I prefer to employ at any suitable number of places in the length of the cable coiled springs 79 shown in Fig. 7 which springs tend to automatically take up any slack which occurs.

In Figs. 10 to 13 inclusive I have illustrated the structural details of the novel type of sprocket wheel which I have designed. It will be noted that the rim 26 of the wheel is of channeled formation with the flanges facing inwardly and that annular plates 80 secured to the flanges of the rim 26 provide an outwardly facing channel within which a number of teeth supporting blocks 81 may be mounted. These blocks are secured between the plates 80 by bolts 82 or in any suitable manner. Integral with the blocks are outwardly projecting extensions 83 of wedge shape in cross section. Teeth-bearing blocks 84 are provided with bevelled recesses 85 lined with packing material 86 which packing material is adapted to be jammed into frictional engagement with the wedge shaped extension 83 of the block 81 when the teeth-bearing members 84 are carrying the chain.

It will be noted that the members 84 are provided with pairs of teeth 87, 88 at opposite ends. The teeth 87 are adapted to straddle the narrower links of the chain and engage the rounded ends 65 of the wider links. The teeth 88 on the other hand are adapted to enter between the plates 64 of the wider links and to engage with the rounded ends 65 of the narrower links.

Coiled expansion springs 89 backed against suitable seats 90 at the ends of the block 81 are engageable with shoulders 91 on the block and tend to move the teeth-bearing block 84 out of wedging engagement with the extension 83. In order to prevent loss of the block 84 as this member is carried around the bottom of the sprocket wheel, cross pins or rivets 92 connect the plates 80 and are accommodated in enlarged alined openings 93, 94, 95 of the extension 83 packing 86 and block 84 respectively.

It may be noted that the ends of the teeth 88, 87 are bevelled as at 96 so that the teeth may be more conveniently guided into proper engagement with the joints of the chain as the chain reaches the sprocket wheel.

In the ordinary sprocket wheel and chain arrangement one tooth of the sprocket wheel usually carries the entire weight of the chain due to the fact that there is no exact fit between the sprocket teeth and the chain links. Where a very heavy load is to be carried, as in the present construction, it is obviously desirable that the weight of the load be distributed substantially equally among all of the teeth of the sprocket wheel, in order to prevent stripping the teeth from the wheel. By virtue of the construction herein illustrated each tooth "finds itself" and assumes its share of the load at the time that it engages the chain. As the tooth-bearing member 84 comes into contact with the joint of the chain, the block 84 is forced home against the wedge 83 to a position where it is fully loaded or where it is substantially sustaining its share of the load of the chain. The weight of the lower section of the chain with its cabins tends to move each joint of the chain radially inwardly towards the center of the sprocket wheel as the chain reaches the wheel, which inward movement of the chain will set the teeth-bearing member 84 in an efficient load lifting position.

The function of the springs 89 is not to sustain the weight of the loaded chain since such weight is transmitted directly to the wedges. The springs merely serve to move the block 84 off the wedges as the block is disengaged from the chain so that the block may be in a free condition to be properly forced home on its wedge upon the next revolution of the sprocket wheel.

The sprocket wheel is equally effective regardless of the direction of rotation thereof.

The pins 92 do not sustain any of the load strains but merely prevent loss of the blocks 84 as they are pushed out by the springs 89.

It is to be borne in mind that while the drawings show the device on a small scale the chain links in practice will be from four to six feet long and the teeth of the sprocket wheel correspondingly spaced apart. Inasmuch as the rounded ends of the links substantially fit the chain guideways little pivotal movement and no collapse of the chain can occur in the event of the chain breaking at any point. Thus the chain with its associated guideways is adapted to serve not only as a suspension means for the cabins but as a rigid supporting means therefor in the case of an emergency.

Referring to Figs. 1 and 9 it will be noted that I have provided means for cutting off the motor circuit in the event that the lower chain guide section 53 pulls away from the vertical chain guide section 42 as the weight of the cabins is wholly or partly transferred to section 53 due to a break in one or both of the chains. This means includes a pair of fingers 97, 98 mounted on insulating blocks 99 secured to the chain guide sections 42, 53. These fingers are normally in circuit with the motor 34 through the controlling switch 100 and through the source of current 101. When, however, the lower section of the chain guide is depressed the spring fingers move out of contact and automatically cut off the motor circuit even when the main switch is closed.

The operation of the device is substantially as follows: An automobile driven onto the loading floor 19 may be moved into any cabin compartment which is alined with the loading floor through the doorway 21. When the motor 34 is set in motion it operates through the train of reducing gears 36, 38, 41, 33 to impart motion to the sprocket wheels 25, and the chains so that the cabin 56 which has just received a car will move either up or down away from the deliver floor and a new empty cabin may be presented to receive the next car.

When the owner comes for his car the particular cabin in which his car may be moved in either direction to a position where it is alined with the delivery floor 18 and may be driven out onto the delivery floor through the doorway 20.

It will be realized that the sprocket wheels and the massive sprocket chains must support a tremendous weight particularly where the vertical chain runs are long and the storage cabins are loaded with cars. It will also be realized that it is imperative to prevent a break in one of the chains or both of the chains from causing the storage cabins to fall into the bottom of the shaftway.

The present types of elevator safety devices are of little value for a construction such as is illustrated here, since they rely for the most part on the momentum of a car to set them in operation. Obviously if the cabins of the chain or any cabin of any chain in the present case was permitted to gain momentum when the chain broke the result would be disastrous. By using the special sprocket chains and guides which I have illustrated a break in one or both of the chains is not serious. When a chain breaks the chain links have a sustaining function and serve as rigid props. When a break occurs most of the weight of the entire line of cabins is transferred directly to the lower chain guideway 53 which guideway is forced down on its supporting springs 61 breaking the contact between the spring fingers 97, 98 and automatically shutting off the motor 34.

The manner in which the cables serve as guide means for the cabins to prevent the cabins from swaying as they pass through the crossway has already been described. These cables serve a secondary safety function in the event that one of the cabins supporting hanger bars 57 breaks away from the chain. When such a contingency occurs the weight of the particular cabin is transferred directly to the cables. These cables while not sufficiently strong to support the weight of the entire chain of cabins, are sufficiently strong to conveniently support the weight of a single cabin which may break away from its supporting cross rod 57.

It may be noted that when such a contingency occurs the cabin in question cannot drop directly onto the cabin beneath it due to the fact that it is held by the cables and the further fact that it fits its shaftway so snugly that it cannot swing about its lower cross rod 58. It is desirable to supplement the rollers 74, 75, 78 of the upper and lower supporting cross bars by rollers 102 on the front and rear of the cabin 56 which rollers contact with the front and rear of walls of the shaftway 15.

The special chains, guides and sprockets while primarily intended for use in a garage or other elevator storage structure may be conveniently embodied in various other types of mechanism and are in themselves of general utility.

It will thus be seen that there is herein described a device in which the several features of this invention are embodied and which device in its action attains the various objects of the invention and is well suited to meet the requirements of practical use.

As many changes could be made in the above construction and many apparently widely different embodiments of the inven-

I claim:

1. In a storage building, a pair of spaced vertical shaftways, upper and lower crossways connecting the shaftways, spaced sprocket wheels on the upper crossway, vertical chain guides on the shaftway walls, curved chain guides in the lower cross space connecting the lower ends of the vertical guides, endless chains in the guides actuated by the sprocket wheels, and storage cabins hung between the chains and carried through the shaftways and crossways by the chain, said lower curved chain guide being mounted on supporting springs and having its ends held in abutting relationship with the vertical guides by said springs.

2. In a storage building, a pair of spaced vertical shaftways, upper and lower crossways connecting the shaftways, spaced sprocket wheels in the upper crossway, vertical chain guides on the shaftway walls tangential to the sprocket wheels, curved chain guides in the lower cross space connecting the lower ends of the vertical guides endless chains in the guides actuated by the sprocket wheels and cabins hung between the chains and carried through the shaftways and crossways by the chains said lower curved chain guide being mounted on supporting springs and held by said springs in abutting relationship with the vertical guides, and means controlled by said curved guide section for indicating a break in the chain.

3. In a storage building, a pair of spaced vertical shaftways, upper and lower crossways connecting the shaftways, spaced sprocket wheels in the upper crossway of a diameter substantially equal to the distance between the centers of the shaftways, vertical chain guides on the shaftway walls, curved chain guides in the lower cross space connecting the lower ends of the vertical guides, endless chains travelling in the guides and actuated by the sprocket wheels, cabins hung between the chains and carried through the shaftways and crossways by the chains, said lower curved chain guide being mounted on supporting springs and held by said springs in abutting relationship with the vertical guides, said chains comprising endless connected series of rigid pivotally connected links adapted to withstand compression strains and held against buckling by the guideways, whereby the weight of the cabins is transferred to the lower curved guideways when the chains break.

4. In a storage building, a pair of spaced vertical shaftways, upper and lower crossways connecting the shaftways, spaced sprocket wheels in the upper crossway, vertical chain guides on the shaftway walls, curved chain guides in the lower cross space connecting the lower ends of the vertical guides, sprocket driven chains in the guides, cabins hung between the chains said lower curved chain guide being mounted on supporting springs and held by said springs in abutting relationship with the vertical guides, said chains comprising endless series of rigid pivotally connected links adapted to withstand compression strains and held against buckling by the guideways, whereby the weight of the cabins is transferred to the lower curved guideway when the chains break, and means actuated by the sagging of said guideway on its springs to stop rotation of the sprocket wheels.

Signed at New York, in the county of New York and State of New York, this 1st day of May, A. D. 1928.

ERNST GEIGER.